(12) United States Patent
Tran et al.

(10) Patent No.: US 6,658,018 B1
(45) Date of Patent: Dec. 2, 2003

(54) METHOD AND SYSTEM OF PROVIDING ADVANCED TEAMING FUNCTIONALITY CAPABLE OF UTILIZING HETEROGENEOUS ADAPTERS TO IMPROVE UTILITY AND PERFORMANCE

(75) Inventors: Han N. Tran, Beaverton, OR (US); Daniel A. Brown, Beaverton, OR (US); Gangadhar D. Bhat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/345,437

(22) Filed: Jun. 30, 1999

(51) Int. Cl.$^7$ .................................................. H04J 3/16
(52) U.S. Cl. ......................... 370/465; 709/222; 709/328
(58) Field of Search .......................... 370/465; 709/222, 709/328; 710/8; 711/103

(56) References Cited

U.S. PATENT DOCUMENTS

| | | | | |
|---|---|---|---|---|
| 5,454,078 A | * | 9/1995 | Heimsoth et al. | 709/222 |
| 5,655,148 A | * | 8/1997 | Richman et al. | 710/8 |
| 6,212,575 B1 | * | 4/2001 | Cleron et al. | 709/328 |
| 6,317,849 B1 | * | 11/2001 | Patel | 711/103 |

* cited by examiner

Primary Examiner—Salvatore Cangialosi
(74) Attorney, Agent, or Firm—Pillsbury Winthrop LLP

(57) ABSTRACT

The present invention discloses a system and computer-readable medium for dynamically maximizing throughput performance of a fault-tolerant network adapter team capable of supporting network adapters of similar and dissimilar types. The fault-tolerant adapter team includes a plurality of network adapters, which are coupled to a computer system (i.e., network server) and interfaces with a data communications network. The system makes use of an agent module, which assesses the capabilities of each of the network adapters in the team and automatically selects a primary adapter for accommodating a substantial portion of the network data traffic. This selection is based on the agent module assessment. In the event of primary adapter failure, the system automatically switches over to the best available alternate primary adapter, which is automatically selected on the basis of the agent assessment. The alternate primary adapter then accommodates a substantial portion of network data traffic. If a replacement adapter is substituted for any failed adapter, including the failed primary adapter, the agent automatically assesses the replacement adapter's capabilities and automatically designates the replacement adapter as the new primary adapter based on the agent assessment. The system then automatically switches the data traffic back, from the alternate primary to the new primary adapter.

30 Claims, 6 Drawing Sheets

METHOD AND SYSTEM OF PROVIDING ADVANCED TEAMING FUNCTIONALITY CAPABLE OF UTILIZING HETEROGENEOUS ADAPTERS TO IMPROVE UTILITY AND PERFORMANCE

BACKGROUND OF THE INVENTION

1. Field of the Invention

This invention generally relates to the field of data communication networks. More particularly, the present invention relates to a method and system of providing advanced teaming functionality, capable of accommodating heterogeneous adapters to improve the utility and performance of a fault-tolerant network adapter team.

2. Description of Related Art

Most computer communication networks designate at least one computer as its network server. Servers operate as centralized repositories for all the applications and workfiles available on the network and provide an expedient way to interconnect and execute programs that are distributed across a network. Servers are also responsible for managing the access and flow of information on the network. As a result, enterprises are increasingly relying on such networks to support both routine and business-critical applications.

Such networks, however, are not without weaknesses. For example, as illustrated in the lower portion of FIG. 1 (Prior Art), a particularly susceptible element in all networks is the network link 191A to the server 100A. The network link 191A is physically coupled to an adapter 101A (i.e., network interface card) installed within the server 100A. As such, all data traveling to, and from, the network must pass through the adapter 101A. A failing adapter 101A will, therefore, compromise the network server 100A connectivity and ultimately result in the loss of productivity.

In an effort to guard against such vulnerability, fault-tolerant adapter teams 105, as shown in the upper portion of FIG. 1, have been developed which rely on redundancy for their restorative capabilities. These adapter teams 105, typically comprise a set of M adapters 101, 101B, 101C, . . . 101M along with corresponding team software, and can be manually configured, by the network administrator, to designate one of the adapters as "primary" 101 and the remaining adapters as "secondary adapters" 101B, 101C, . . . 101M. The primary adapter 101 is configured to support a primary connection 191 to the network and embodies the identity of the adapter team 105 by having its Media Access Control (MAC) address serve as the network adapter 101 address. As such, all communications destined for the server 100 shall be directed towards the primary adapter.

Meanwhile, the secondary adapters 101B, 101C, . . . 101M serve as back-up connections. The adapter team 105 software contains one or more intermediate drivers 185 that monitor all network connections 191, 191B, 191C . . . 191M and, in the event of primary adapter 101 failure, the software provides "fail-over" capability by defaulting to a pre-selected secondary adapter (i.e., 101B) as the alternate primary. The pre-selected secondary adapter is the secondary adapter in the adapter team 105 determined to be most capable. Traffic is subsequently re-routed to the alternate primary adapter, while still utilizing the original primary (or team) 101 address. Thus, the pre-selected secondary adapter 101B automatically assumes ownership of all data going to the server 100, without the need for human intervention. In some instances, the team's software also provides for automatic "restore-back" capabilities, which allows a replacement adapter, positioned in a team slot previously occupied by a failing primary adapter 101, to be re-instituted as the primary if the software senses that the adapter is fully operational. In this manner, the redundant set of adapters 101, 101B, 101C . . . 101M provides network link recovery that is generally transparent to applications and users.

It is also possible to capitalize on the existence of multiple adapters in a team to increase the effective system bandwidth. For example, Adaptive Load Balancing techniques make use of the team's M adapters 101, 101B, 101C, . . . 101M to increase performance by balancing the transmission of data from the server 100 to the network. In such a configuration, the team's address, which as stated above, is the primary adapter's address, is advertised to the network. Accordingly, all server-bound traffic is received by the primary adapter 101. The remaining M-1 team adapters (referred to above as secondary adapters) 101B, 101C, . . . 101M do not receive any traffic originated by the client. However, the M-1 team adapters 101B, 101C, . . . 101M, as well as the primary adapter 101, do transmit data from the server 100 to the network. The transmission of data is achieved by ratably allocating the data across the primary adapter 101 and remaining M-1 team adapters 101B, 101C, . . . 101M. This effectively aggregates the outgoing server bandwidth, thereby increasing network throughput and mitigating bottlenecking episodes.

Although conventional fault-tolerant adapter teams 105 are capable of providing fast and reliable recovery from adapter failures, a high premium is often paid in both hardware cost and network efficiency. One reason for such a high premium in conventional teams 105 arises from the need to have adapters of the same type or speed to ensure a seamless fail-over transition. This significantly increases the cost of system maintenance by forcing the purchase of similar adapters and rendering dissimilar adapters unusable. This also limits the choice of adapters that can be utilized in fault-tolerant teams 105 or Adaptive Load Balancing teams 105. Such limitations can be particularly costly when changes in the server 100 configuration precipitates adapter upgrades, rendering all the inventoried adapters obsolete.

Moreover, conventional symmetric fault-tolerant teams 105 require the manual designation of the primary adapter 101. These conventional teams 105 are, therefore, incapable of either automatically initializing the primary adapter 101 or doing so in an intelligent and efficient manner.

Furthermore, Adaptive Load Balancing teams 105 capable of accommodating dissimilar adapters, cannot select, "on the fly", the adapter with the next-best performance profile that optimizes network throughput. Because the incoming data is solely routed to the primary adapter 101 and the outgoing data is proportionately balanced across all M team adapters 101, 101B, 101C, . . . 101M, a non-optimal secondary adapter 101B selection can compromise the efficiency of a network.

In addition, some advanced servers 100 possess hot-plug capabilities, allowing network administrators to swap components without powering down the server 100. With respect to hot-plug-compatible fault-tolerant teams 105, hot-plugging is achieved by electrically isolating a port in the team while maintaining power to the rest of the team ports. Conventional hot-plugging adapter teams 105, however, only permit the failed adapter to be replaced by an identical adapter. This further limits the choice of adapters available for fault-tolerant teams 105.

What is needed is a system and method that can overcome the limitations of conventional systems by providing advanced teaming functionality which is capable of supporting both, similar and dissimilar network adapters, to improve the utility and performance of fault-tolerant adapter teams.

SUMMARY

Systems and methods consistent with the principles of the present invention address the need identified above and overcomes the prior art limitations by presenting a system and method that provides advanced teaming functionality which is capable of supporting both similar and dissimilar network adapters, to improve the utility and performance of fault-tolerant adapter teams.

Accordingly, a system and method, consistent with the principles of the present invention as embodied and broadly described herein, includes a team of multiple network adapters such that the team is capable of concurrently supporting network adapters of similar and dissimilar types. The capabilities of each of the network adapters in the team are dynamically assessed and based on the capabilities of the adapters, a primary adapter is selected.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

Figure 1:
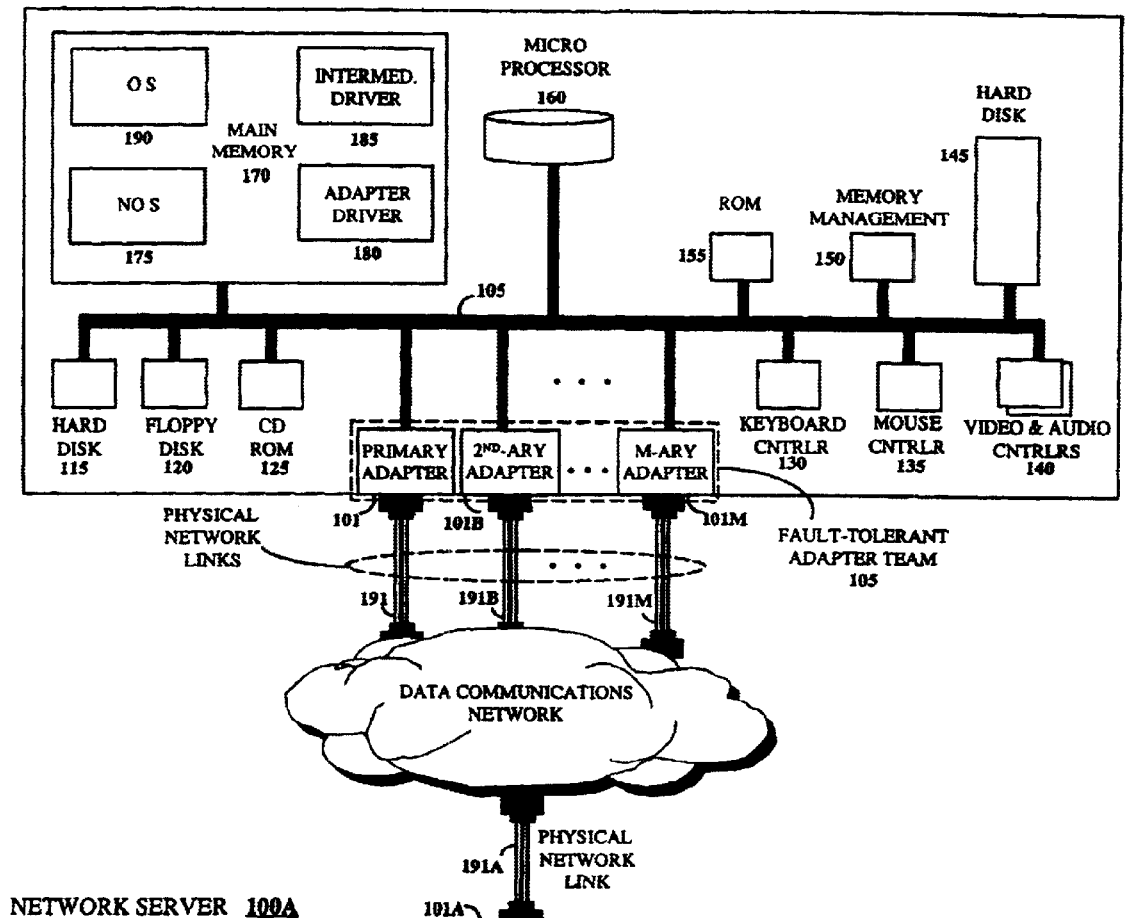
FIG. 1 (Prior Art) is a system level block diagram various components of a computer network server interfacing with a data communications network, including network adapters and fault tolerant teams.
Figure 1:
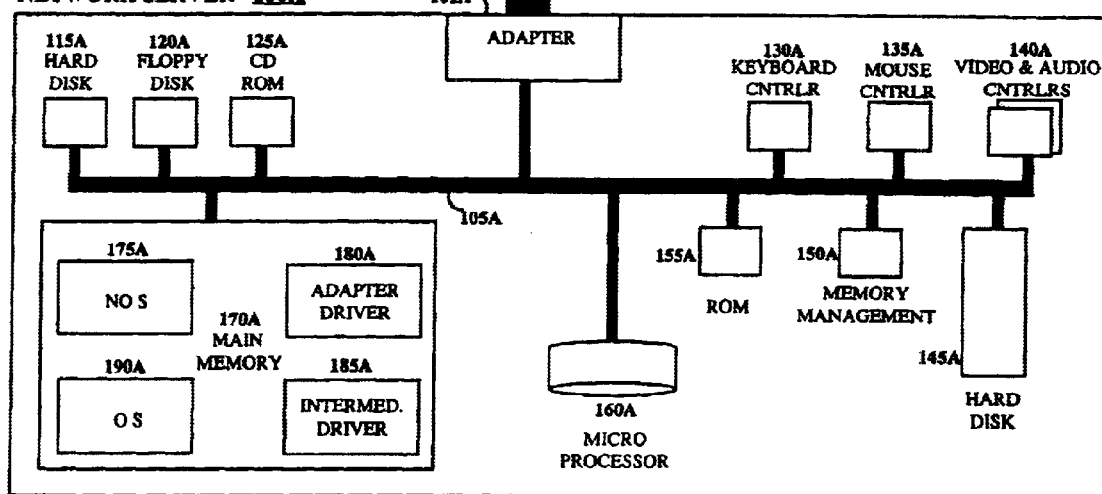
Figure 2:
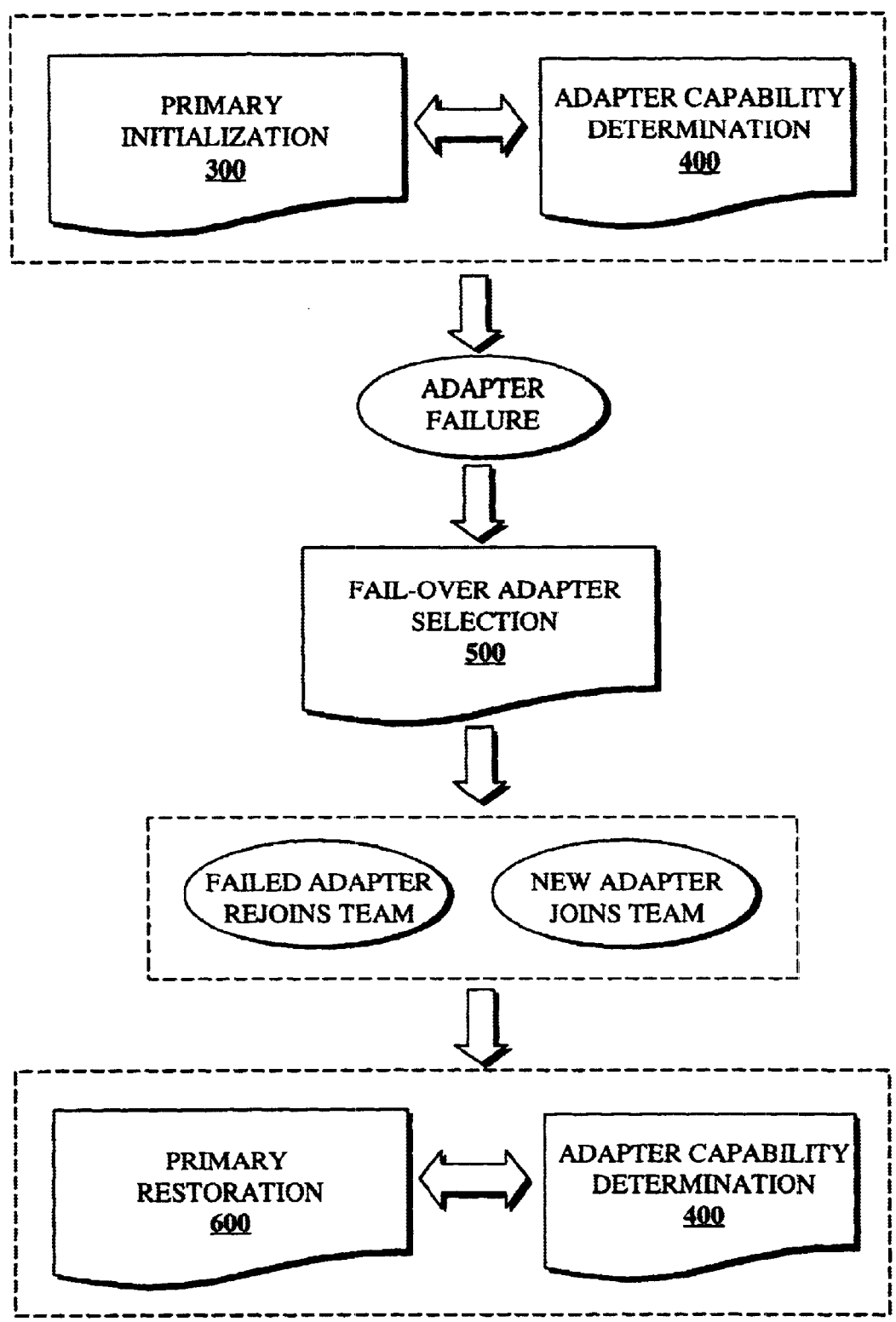
FIG. 2 is a high-level flow diagram depicting the integration of the various routines comprising an embodiment of the present invention.

An embodiment of the present invention is illustrated by the high-level flow diagram of FIG. 2, which integrates the various routines comprising the method of the present invention. The embodiment includes a primary selection routine 300, an adapter capability determination routine 400, an alternative primary adapter selection routine 500 and an adapter restoration routine 600. These routines may be stored in any storage device, such as, for example, a computer system main (non-volatile) memory 170, an optical disk 125, magnetic tape or disk 120, or on the memory, if any, incorporated on the network adapters. Furthermore, these routines may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

Figure 3:
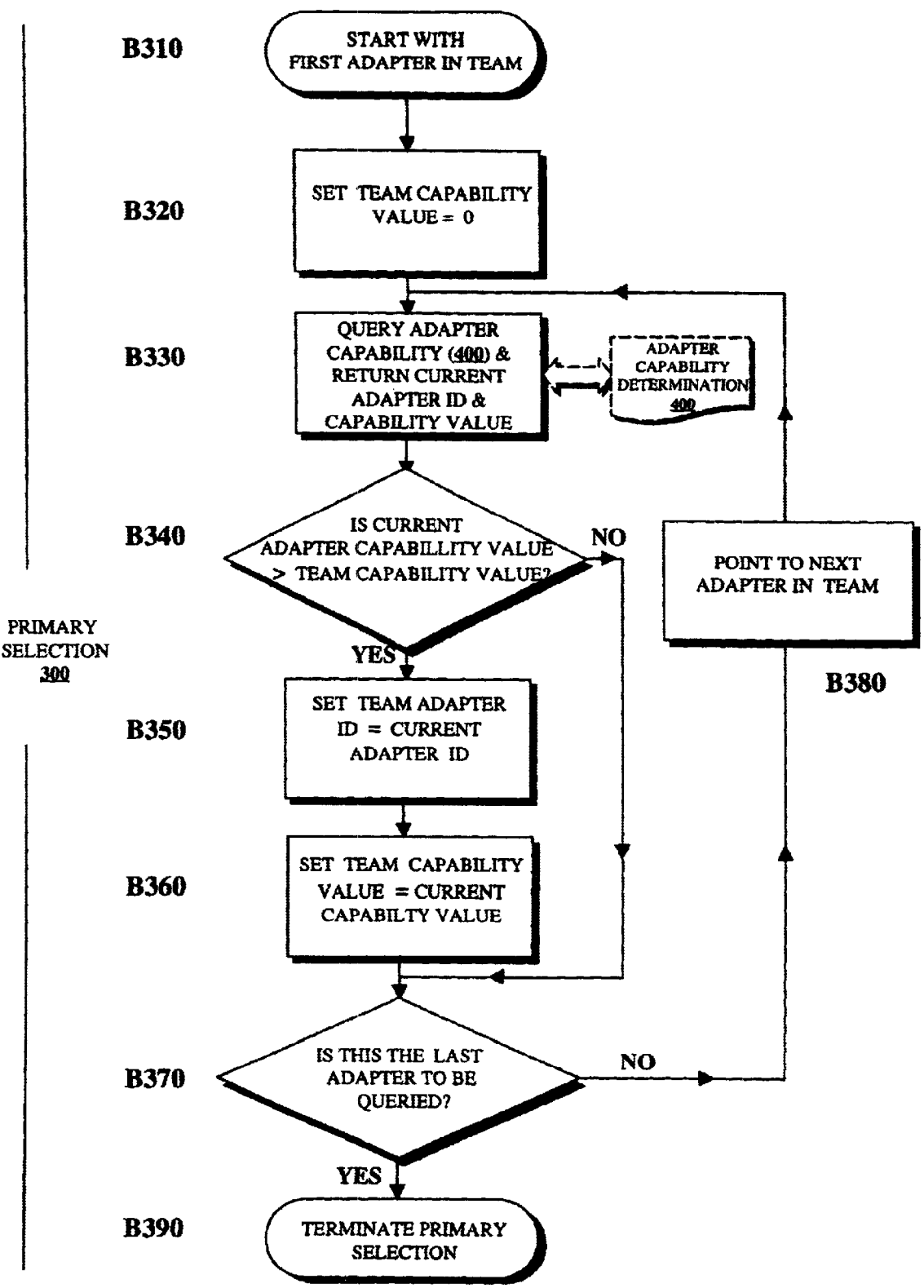
FIGS. 3, 4, 5, and 6 are high-level flow diagrams depicting the operation of various routines comprising an embodiment of the present invention.

The first part of this embodiment, as shown in FIG. 3, is the primary selection routine 300, which designates one of the team adapters as an initial primary adapter, based on the adapters' capabilities. The selection routine 300 is triggered at the creation of the network adapter team and, as illustrated in block B310, begins with the first adapter in the team. In block B320, the selection routine 300 initializes a team capability value to 0. The team capability value is a figure of merit indicating the value of the adapter in the team with the highest priority. In block B330, routine 300 queries the adapter capability determination routine 400 for the current adapter. The adapter capability determination routine 400 then returns an adapter capability value, corresponding to the current adapter. As explained in more detail with respect to routine 400, the adapter capability value reflects the adapter's priority by relating to the adapter's properties and capabilities.

In block B340, routine 300 compares the current adapter capability value to the team (i.e., maximum) capability value. If the current adapter capability value is greater than the team capability value, then in block B350, the team adapter ID, which corresponds to the primary adapter ID, is set to the current adapter ID. In block B360, the team capability value is set to the current adapter capability value, which essentially designates the most qualified adapter as the primary adapter. If the current adapter capability value is not greater than the team capability value, routine 300 progresses to block B370.

In block B370, the routine 300 determines whether the current adapter is the last adapter in the team to be queried. If the current adapter is not the last adapter then routine 300 loops back to block B380 in order to query the next team adapter in sequence. Routine 300 continues blocks B330–B360 until all team adapters have been queried, and if the current adapter is the last team adapter, routine 300 terminates in block B390. As such, the last adapter in the team having its adapter ID designated as the team adapter ID, is the selected primary adapter.

Figure 4:
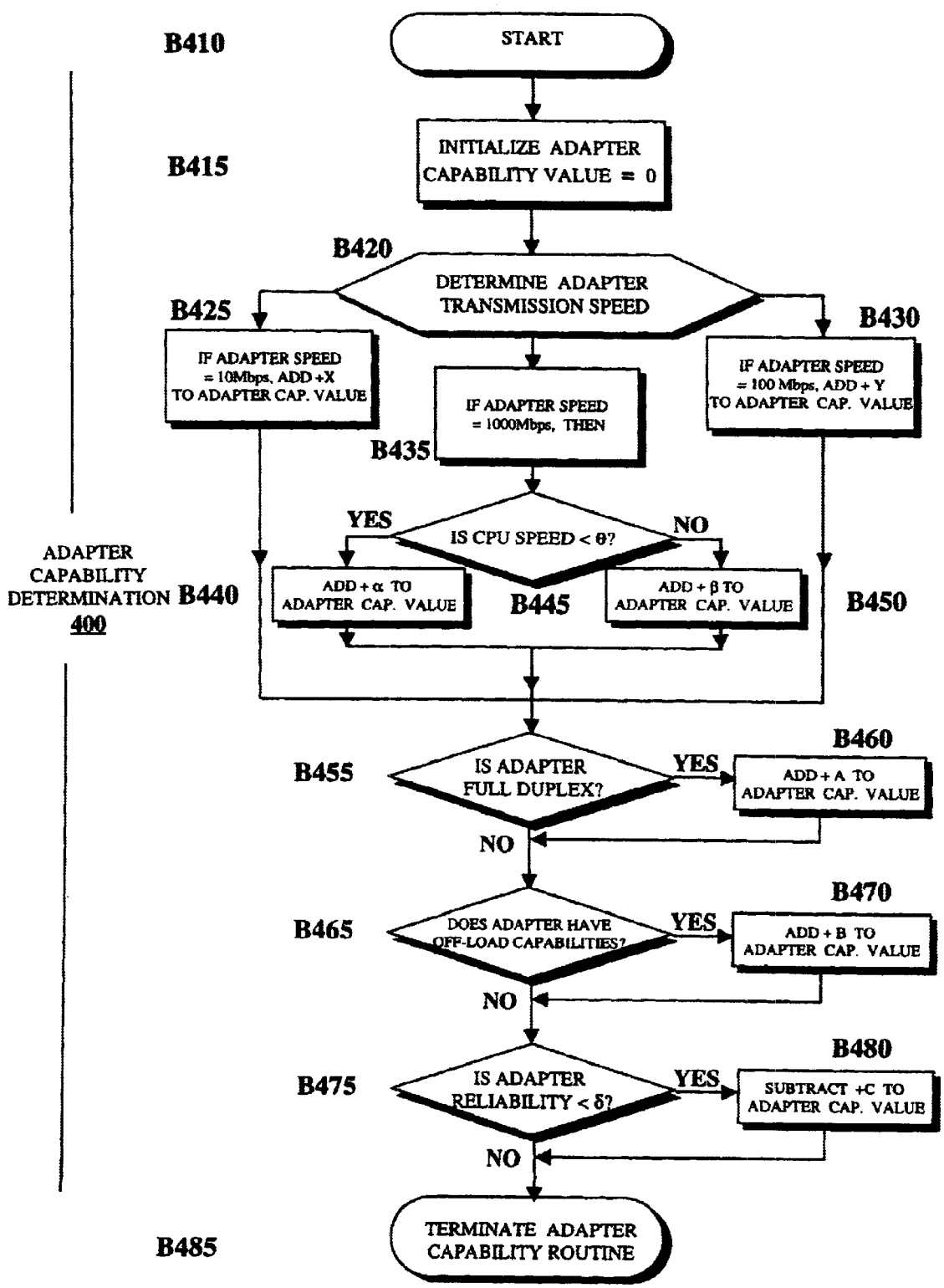

The second part of this embodiment, as shown in FIG. 4, is the adapter capability determination routine 400 which, as indicated above, assigns an adapter capability value for each adapter in the team, based on the adapter's capabilities and position.

The adapter capability value is used by routine 300 to select a primary adapter. However, for adapters in Adaptive Load Balancing teams, the adapter capability value may be used, for example, to select the most qualified adapter capable of receiving data traffic from the network. Such usage can be tailored to suit various Adaptive Load Balancing team configurations and will promote the optimization of load balancing features.

The adapter capability value is a numeric value, calculated by adding various weighting factors corresponding to an adapter's attributes. The adapter capability value is then used to rank each adapter in a fault-tolerant team. Because these weighting factors are relative values, artisans of ordinary skill will recognize that these factors must be optimized for each system. To this end, the factors indicated herein are represented in generic terms.

The capability determination routine 400 begins by initializing the adapter capability value for a particular adapter, as shown in block B415. In block B420, the capability determination routine 400 then determines the adapter transmission rate (i.e., speed). If the adapter speed is 10 Mbps, routine 400 increments the adapter capability value by a predetermined amount X, as shown in block B425. If the adapter speed is 100 Mbps, routine 400 increments the adapter capability value by a predetermined amount Y, as indicated in block B430. If, as in block B435, the adapter speed is 1000 Mbps (i.e., 1 Gbps), routine 400 then advances to block B445 to determine whether the microprocessor speed of the server is less than a predetermined amount θ, as depicted in B445. If so, routine 400 increments the adapter capability value by a certain amount α, as indicated in block B440; if not, routine 400 increments the adapter capability value by a different amount β, as indicated in block B450. This allows routine 400 to consider, and calculate, the degree to which the server microprocessor can accommodate a 1 Gbps transmission rate.

In block B455, routine 400 determines whether the adapter is configured for full duplex data transmission. If so, routine 400 increments the adapter capability value by a predetermined amount A, as shown in block B460. If the adapter is not configured for full duplex, routine 400 advances to block B465.

In block B465, routine 400 determines whether the adapter has off-load capabilities. Off-load capabilities are possible through adapter-enhanced features, such as on-board adapter processors. On-board processors increase server efficiency by enabling the adapter to perform certain tasks, thereby relieving the server microprocessor (i.e., off-loading) from such duties. These off-load capabilities include security features and speed enhancements. If the adapter does contain off-load capabilities, routine 400 increments the adapter capability value by a predetermined amount B, as indicated in block B470. If the adapter does not contain off-load capabilities, routine 400 advances to block B475.

In block B475, routine 400 determines whether the adapter has a reliability factor less than a predefined amount, δ. The reliability factor is based on statistics collected by the server and can be defined in accordance with various criteria. Such criteria may include, the number of times and frequency that a particular adapter failed, the number of transmit under-run associated with a particular adapter, and the number of receive over-run errors associated with a particular adapter. If the adapter has a reliability factor less than δ, routine 400 decrements the adapter capability value by a predetermined amount, C, as depicted in block B480. If the adapter does have a reliability factor greater than δ, the adapter capability determination routine 400 terminates, as shown in block B485.

Figure 5:
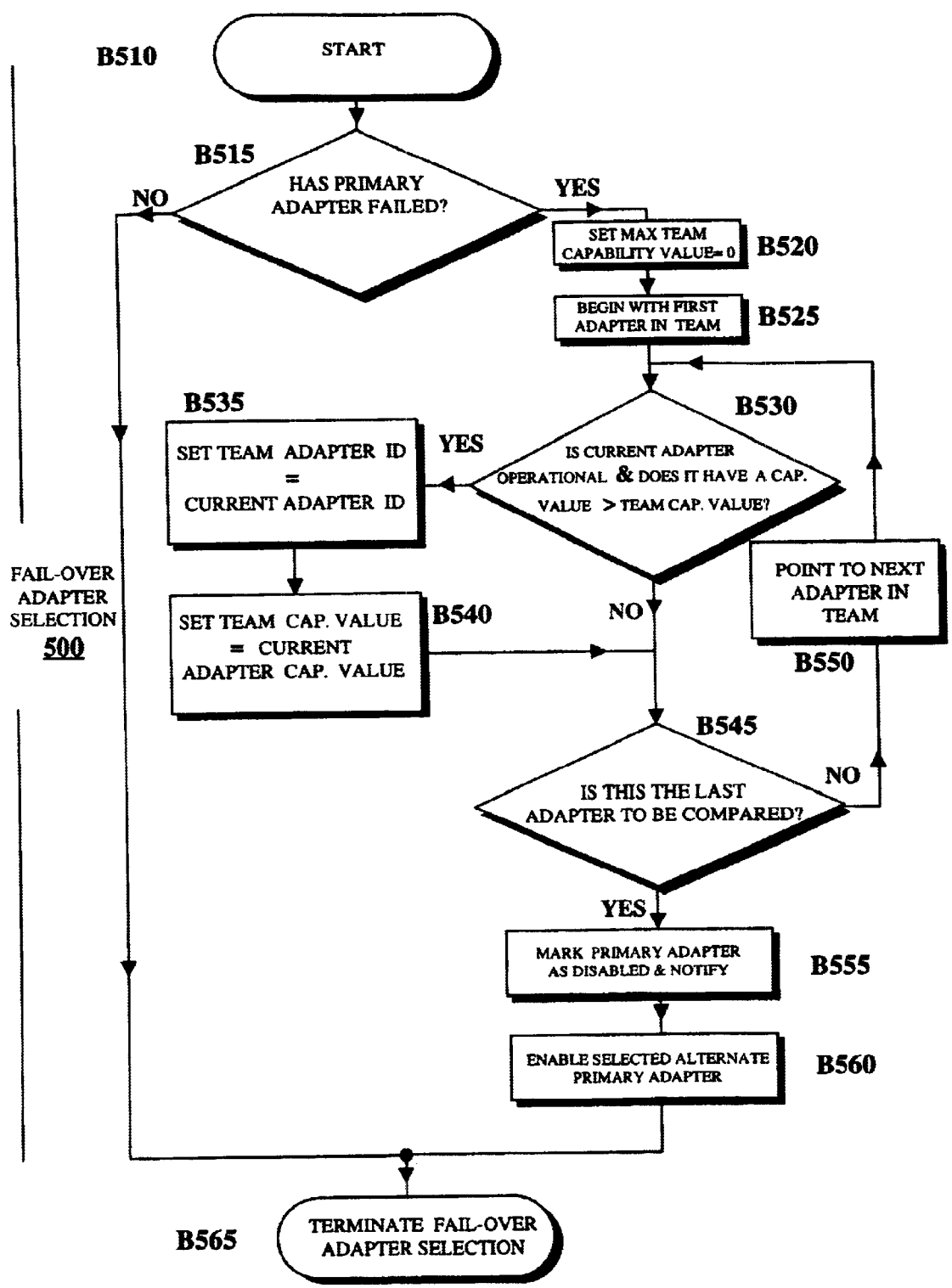

FIG. 5 illustrates the third part of this embodiment, the alternate primary adapter selection routine 500, which executes upon the failure of a primary adapter in the team. The alternate primary adapter selection routine 500 selects an alternate primary adapter, which is automatically switched to, in the event that the primary has failed. As shown in block B515, routine 500 first determines whether the failing adapter is the primary adapter. If it is not the primary adapter, routine 500 terminates, as shown in block B560. If it is the primary adapter, routine 500 advances to block B520.

In block B520, routine 500 initializes the team capability value to 0. In block B525, routine 500 begins by pointing to the first adapter in the team. In block B530, routine 500 compares the current adapter ID to the maximum adapter ID by determining both, whether the current adapter is operational and whether it has a capability value greater than the team capability value. If the current adapter fails to satisfy any of the conditions, routine 500 advances to block B545. If the current adapter is operational and contains a capability value greater than the team capability value, routine 500 progresses to blocks B535 and B540, which respectively set the maximum adapter ID and the team capability value equal to the current adapter ID and capability value. By doing so, blocks B535 and B540 effectively select the alternate primary adapter.

In block B545, routine 500 determines whether all the adapters have been subjected to the comparison block B530. If not, routine 500 loops back to block 530 in order to subject the next team adapter in sequence to the comparison. Routine 500 continues blocks B535–B545 until all team adapters have been compared, and if the current adapter is the last team adapter then routine 500 advances to block B550.

In block B555, routine 500 marks the primary adapter as disabled and provides some notification to the network administrator of the primary adapter failure. After this marking and notification, block 560 enables the selected alternate primary adapter and then routine 500 terminates, as indicated in block B565.

Figure 6:
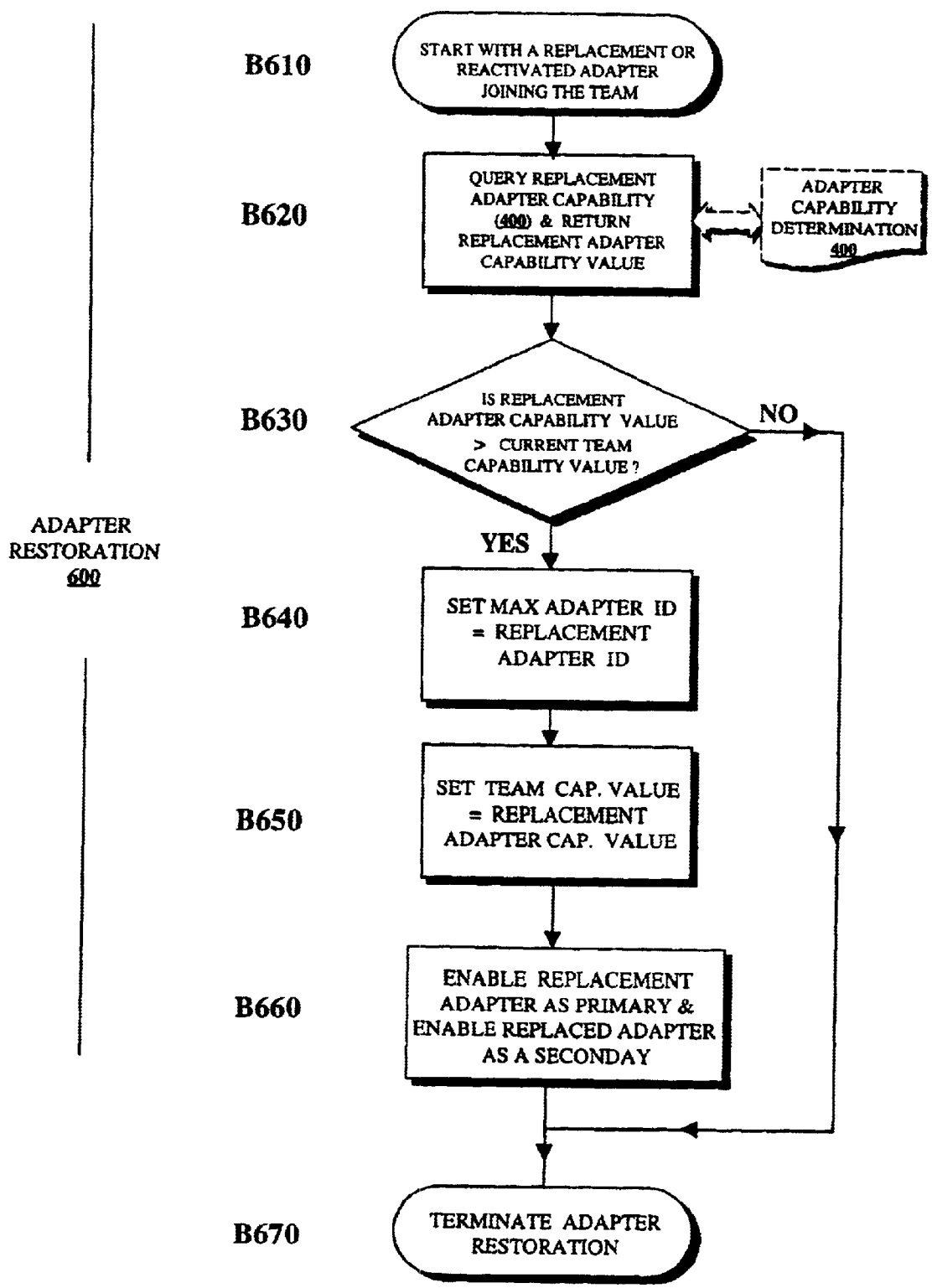

FIG. 6 illustrates the last part of this embodiment, the adapter restoration routine 600, which is invoked after a replacement adapter is substituted for any failed adapter or a failed adapter is restored to on-line service by, for example, replacing the network cable to the adapter. The replacement adapter may be any adapter, including the failed primary that has been repaired, reconditioned, or merely reconnected. The adapter restoration routine 600 evaluates the replacement adapter and automatically restores it as the new primary adapter if its attributes are greater than any of the remaining adapters in the team, including the alternate primary adapter selected by routine 500. Upon replacing the adapter, the restoration routine 600, in block B620, queries the adapter capability determination routine 400 for the replacement adapter. The adapter capability determination routine 400 then returns an adapter capability value, corresponding to the replacement adapter.

In block B630, routine 600 determines whether the replacement adapter capability value is greater than the current team capability value. If not, routine 600 advances to the termination block of B670. If the replacement adapter possesses an adapter capability value greater than the current team capability value, routine 600 progresses to block B640, which sets the maximum adapter ID equal to the replacement adapter ID. Subsequently, in block B650, routine 600 sets the team capability value equal to the replacement adapter capability value. By doing so, blocks B640 and B650 effectively restore the replacement adapter as the new primary adapter. Block B660, then enables the replacement adapter and enables the replaced adapter as a secondary adapter. The restoration routine 600 is subsequently terminated, as per block B670. As stated above, routine 600 may be used to activate any adapter that replaces a failing adapter, and will designate the replacement adapter as the new primary adapter, if it is assessed as the most qualified adapter in the team.

It is important to note that the foregoing description of embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method comprising:
   dynamically assessing a plurality of attributes for each of a plurality of network adapters in a team of network adapters, including assigning an adapter value to each of the plurality of network adapters in the team based on the assessed attributes, said team concurrently supporting network adapters of similar and dissimilar types; and
   selecting a primary adapter, from the plurality of network adapters, based on said plurality of attributes for each of said plurality of network adapters, the primary adapter having a higher adapter attribute value than remaining adapters of the plurality of network adapters.

2. The method of claim 1, wherein the assigning includes an operation selected from the group comprising:
   adjusting said adapter attribute value by a first predetermined amount in accordance with adapter transmission speed, and
   adjusting said adapter attribute value by a second predetermined amount if the adapter is configured for duplex transmission of data.

3. The method of claim 1, wherein said assigning includes,
   adjusting said adapter attribute value by a first predetermined amount in accordance with adapter transmission speed,
   adjusting said adapter attribute value by a second predetermined amount if the adapter is configured for duplex transmission of data,
   adjusting said adapter attribute value by a third predetermined amount if the adapter has off-load attributes, and
   adjusting said adapter attribute value by a fourth predetermined amount in accordance with adapter bandwidth reliability.

4. The method of claim 3, wherein said selecting is accomplished by comparing respective adapter attribute values assigned to said adapters in said team and choosing one of said adapters with a greatest adapter attribute value.

5. The method of claim 1, further including automatically switching over to an alternate primary adapter, if said primary adapter fails, wherein said automatically switching over is accomplished by comparing respective adapter attribute values of said adapters in said team and selecting one of said adapters with a second greatest adapter attribute value.

6. The method of claim 5, further including automatically switching back to a replacement adapter replacing any of said network adapters, wherein said replacement adapter is selected as a new primary adapter based on assessment of replacement adapter attributes and said switching back is accomplished by assigning an adapter attribute value to said replacement adapter based on said replacement adapter attributes, comparing replacement adapter attribute value to attribute values of said adapters in said team, and selecting said replacement adapter as said new primary adapter if it has a greatest adapter attribute value.

7. The method of claim 1, wherein said network adapter team incorporates an adaptive load balance technique, such that said primary adapter receives all data directed to a server and proportionately transmits all data directed to said communications network among said adapters in said team, in accordance with said assessed adapter attributes.

8. The method of claim 7, wherein said automatically switching over comprises switching over a receive portion of said data traffic from said primary adapter to said alternate primary adapter and automatically switching back comprises switching back a receive portion of said data traffic from said alternate primary adapter to said replacement adapter.

9. A system comprising:
   an adapter team including a plurality of network adapters, said adapter team concurrently supporting network adapters of similar and dissimilar types;
   an agent module for dynamically assessing a plurality of attributes for each of said plurality of network adapters, including assigning an adapter capability value to each of said plurality of network adapters based on said attributes; and
   a primary adapter for accommodating data traffic, wherein said primary adapter is selected from said plurality of network adapters by said agent module based on said assessment, the primary adapter having a higher adapter capability value than remaining adapters of the plurality of network adapters.

10. The system of claim 9, wherein the assigning by agent module includes an operation selected from the group comprising:
    adjusting said adapter attribute value by a first predetermined amount in accordance with adapter transmission speed, and
    adjusting said adapter attribute value by a second predetermined amount if the adapter is configured for duplex transmission of data.

11. The system of claim 9, wherein said assigning by agent module includes,
    adjusting said adapter attribute value by a first predetermined amount in accordance with adapter transmission speed,
    adjusting said adapter attribute value by a second predetermined amount if the adapter is configured for duplex transmission of data,
    adjusting said adapter attribute value by a third predetermined amount if the adapter has off-load capabilities, and
    adjusting said adapter attribute value by a fourth predetermined amount in accordance with adapter bandwidth reliability.

12. The system of claim 11, wherein said primary adapter is selected by comparing respective adapter attribute values assigned to each of said network adapters in said team and choosing one of said adapters with a greatest adapter attribute value.

13. The system of claim 12, further including an alternate primary adapter for accommodating said data if said primary adapter fails, wherein said agent module automatically switches over said data from said primary adapter to said alternate primary adapter and automatically selects said alternate primary adapter from said plurality of network adapters based on said assessment and wherein said automatic switchover is accomplished by comparing respective adapter attribute values assigned to each of said network adapters in said team and selecting one of said adapters with a second greatest adapter attribute value.

14. The system of claim 13, further including a replacement adapter for replacing a failed primary, wherein said agent module automatically designates said replacement adapter as a new primary adapter based on assessment of replacement adapter attributes and said data is automatically switched back from said alternate primary adapter to said replacement adapter.

15. The system of claim 14, wherein said network adapter team incorporates an adaptive load balance technique such that said primary adapter receives all data directed to a server and proportionately transmits all data directed to a communications network among said adapters in said team in accordance with said assessed adapter attributes.

16. The system of claim 15, wherein said data that is automatically switched over from said primary to said alternate primary, comprises a receive portion of said data and data that is automatically switched back from said alternate primary adapter to said replacement adapter, comprises a receive portion of said data.

17. A method comprising:
dynamically assessing a plurality of attributes for each of a plurality of network adapters in a team of network adapters and assigning an adapter attribute value to each of said network adapters based on said assessment, said team concurrently supporting network adapters of similar and dissimilar types;
selecting a primary adapter, from the plurality of network adapters, based on said assessments by comparing respective adapter attribute values for each of said network adapters in said team and choosing one of said network adapters with a greatest adapter attribute value;
automatically switching over to an alternate primary adapter if said primary adapter fails, by comparing respective adapter attribute values of each of said network adapters in said team and selecting one of said adapters with a second greatest adapter attribute value; and
automatically switching back to a replacement adapter replacing any of said network adapters, wherein said replacement adapter is assigned an adapter attribute value based on said replacement adapter attributes and is selected as a new primary adapter if it has a greatest adapter attribute value when compared to all other adapters of said team.

18. The method of claim 17, wherein said assigning includes,
adjusting said adapter attribute value by a first predetermined amount in accordance with adapter transmission speed,
adjusting said adapter attribute value by a second predetermined amount if adapter is configured for duplex transmission of data,
adjusting said adapter attribute value by a third predetermined amount if adapter has off-load attributes, and
adjusting said adapter attribute value by a fourth predetermined amount in accordance with adapter bandwidth reliability.

19. The method of claim 18, wherein said network adapter team incorporates an adaptive load balance technique, such that primary adapter receives all server-bound data traffic and proportionately transmits all network-bound data traffic among said adapters in said team, in accordance to said assessed adapter attributes.

20. The method of claim 19, wherein said automatically switching over comprises switching over a receive portion of said data traffic from said primary adapter to said alternate primary adapter and automatically switching back comprises switching back a receive portion of said data traffic from said alternate primary adapter to said replacement adapter.

21. The method of claim 17, wherein the assigning includes an operation selected from the group comprising:
adjusting said adapter attribute value by a first predetermined amount in accordance with adapter transmission speed, and
adjusting said adapter attribute value by a second predetermined amount if adapter is configured for duplex transmission of data.

22. A computer-readable medium encoded with a plurality of processor-executable instruction sequences for:
dynamically assessing a plurality of attributes for each of a plurality of network adapters in a team of network adapters, including assigning an adapter attribute value to each of said adapters in said team based on said assessed attributes, said team concurrently supporting network adapters of similar and dissimilar types; and
selecting a primary adapter based on said plurality of attributes for each of said plurality of network adapters, the primary adapter having a higher adapter attribute value than remaining adapters of the plurality of network adapters.

23. The computer-readable medium of claim 22, wherein said assigning includes,
adjusting said adapter attribute value by a first predetermined amount in accordance with adapter transmission speed,
adjusting said adapter attribute value by a second predetermined amount if adapter is configured for duplex transmission of data,
adjusting said adapter attribute value by a third predetermined amount if adapter has off-load capabilities, and
adjusting said adapter attribute value by a fourth predetermined amount in accordance with adapter bandwidth reliability.

24. The computer-readable medium of claim 23, wherein said selecting is accomplished by comparing respective adapter attribute values assigned to said network adapters in said team and choosing one of said network adapters with a greatest adapter attribute value.

25. The computer-readable medium of claim 24 further including automatically switching over to an alternate primary adapter, if said primary adapter fails, wherein said automatically switching over to said alternate primary adapter is accomplished by comparing respective adapter attribute values of said network adapters in said team and selecting one of said network adapters with a second greatest adapter attribute value.

26. The computer-readable medium of claim 25, further including automatically switching back to a replacement adapter replacing any of said network adapters, wherein said replacement adapter is selected as a new primary adapter based on assessment of replacement adapter attributes.

27. The computer-readable medium of claim 26, wherein said automatically switching back to said replacement adapter is accomplished by assigning an adapter attribute value to said replacement adapter based on said replacement adapter attributes, comparing replacement adapter attribute value to attribute values of said adapters in said team, and selecting said replacement adapter as said new primary adapter if it has a greatest adapter attribute value.

28. The computer-readable medium of claim 27, wherein said network adapter team incorporates an adaptive load balance technique, such that said primary adapter receives all data directed to a server and proportionately transmits all data directed to said communications network among said adapters in said team, in accordance with said assessed adapter attributes.

29. The computer-readable medium of claim 28, wherein said automatically switching over comprises switching over a receive portion of said data traffic from said primary adapter to said alternate primary adapter and automatically switching back comprises switching back a receive portion of said data traffic from said alternate primary adapter to said replacement adapter.

30. The computer-readable medium of claim 22, wherein the assigning includes an operation selected from the group comprising:
- adjusting said adapter attribute value by a first predetermined amount in accordance with adapter transmission speed, and
- adjusting said adapter attribute value by a second predetermined amount if adapter is configured for duplex transmission of data.

* * * * *